United States Patent

Utagawa et al.

[11] 4,306,143
[45] Dec. 15, 1981

[54] DEVICE FOR EXTRACTING A PLURALITY OF SPACE FREQUENCY COMPONENTS

[75] Inventors: Ken Utagawa, Yokohama; Kunihisa Hoshino; Hiroshi Shirasu, both of Kawasaki; Akira Ogasawara, Yokohama, all of Japan

[73] Assignee: Nippon Kogaku K.K., Tokyo, Japan

[21] Appl. No.: 109,281

[22] Filed: Jan. 3, 1980

[30] Foreign Application Priority Data

Jan. 20, 1979 [JP] Japan ................... 54/5268

[51] Int. Cl.³ .............................................. G01J 1/20
[52] U.S. Cl. ....................................... 250/201; 250/578
[58] Field of Search ............... 250/201, 204, 550, 209, 250/578; 358/105; 356/71

[56] References Cited

U.S. PATENT DOCUMENTS 4,084,907  4/1978  Pinard et al. .................. 250/550
4,218,623  8/1980  Utagawa ....................... 250/578

Primary Examiner—David C. Nelms
Attorney, Agent, or Firm—Fitzpatrick, Cella, Harper & Scinto

[57] ABSTRACT

A device for extracting a plurality of space frequency components from an optical image formed by an image forming optical system comprises a photoelectric element array including at least N photoelectric elements disposed in or near the image formation plane of the image forming optical system, and means for generating, on the basis of the output of each of the photoelectric elements of the array, an electrical output varying in phase in accordance with the displacement of the optical image in the direction of arrangement of the photoelectric elements.

4 Claims, 28 Drawing Figures

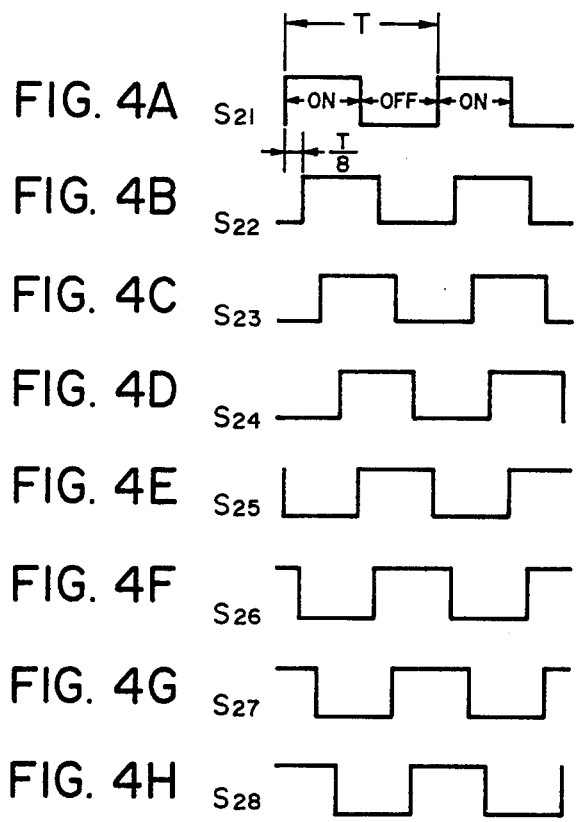
FIG. 4A S21
FIG. 4B S22
FIG. 4C S23
FIG. 4D S24
FIG. 4E S25
FIG. 4F S26
FIG. 4G S27
FIG. 4H S28
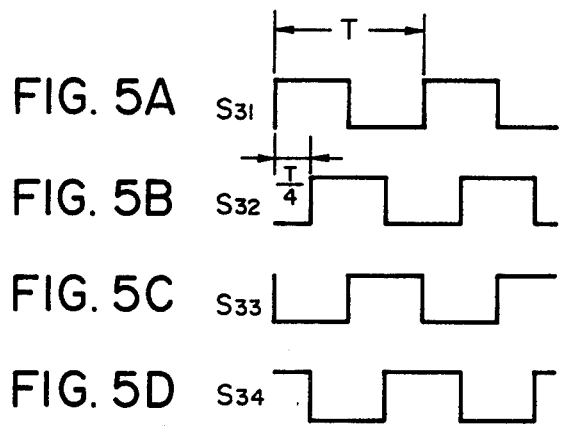
FIG. 5A S31
FIG. 5B S32
FIG. 5C S33
FIG. 5D S34

DEVICE FOR EXTRACTING A PLURALITY OF SPACE FREQUENCY COMPONENTS

BACKGROUND OF THE INVENTION

1. Field of the Invention

This invention relates to a photoelectric conversion device, and particularly to a device for extracting a plurality of space frequency components from an optical image.

2. Description of the Prior Art

Various devices for electrically extracting information related to the specific space frequency component of an optical image and detecting, for example, the focus of an optical system on the basis thereof have been proposed. We already filed, on Nov. 13, 1978, U.S. Application Ser. No. 959,918 (German counterpart P 2848874), now U.S. Pat. No. 4,218,623, covering a device for converting the outputs of the photoelectric element of a photoelectric element array upon which an optical image is projected into vectors having magnitudes corresponding to the magnitudes of said outputs, i.e. absolute values, and phases successively deviated by $2\pi/N$ each (N is an integer equal to or greater than 2) in the order of arrangement of the photoelectric elements and adding together those vectors to thereby extract specific space frequency component information having, as the space period, the length of N photoelectric elements in the direction of arrangement. However, such a specific space frequency component extracting device is useless when the optical image scarcely contains the specific space frequency component, and it is impossible to detect the focus of the optical system on the basis of the output of this device.

To avoid such a situation, a plurality of space frequency components may be extracted from the optical image. For this purpose, it occurs to mind to use a plurality of photoelectric element arrays or to divide a single photoelectric element array into a plurality of areas and extract discrete space frequency components in respective ones of the arrays or areas, but this method does not enable a plurality of space frequency components to be extracted from the same optical image and also suffers from a disadvantage that it requires a number of photoelectric elements.

SUMMARY OF THE INVENTION

It is the object of the present invention to provide a device for extracting a plurality of space frequency components in an optical image projected upon a photoelectric element array from the same photoelectric element output of that array.

The device of the present invention for extracting a plurality of space frequency components from an optical image formed by an image forming optical system comprises a photoelectric element array including at least N photoelectric elements disposed in or near the image formation plane of the image forming optical system, and means for generating, on the basis of the output of each of the photoelectric elements of the array, an electrical output varying in phase in accordance with the displacement of the optical image in the direction of arrangement of the photoelectric elements. Said means includes first vectorizing means for converting the outputs of the photoelectric elements into vectors so that the output of the nth photoelectric element of the array becomes a vector having an absolute value related to said output and a phase given by $\pi/N \times p_1 \times n$, first adding means for adding together the vector outputs of the first vectorizing means, second vectorizing means for converting the outputs of the photoelectric elements into vectors so that the output of the nth photoelectric element of the array becomes a vector having an absolute value related to said output and a phase given by $2\pi/N \times p_2 \times n$, and second adding means for adding together the vector outputs of the second vectorizing means, where $p_1$ and $p_2$ are different integers less than N/2.

The invention will become more fully apparent from the following detailed description thereof taken in conjunction with the accompanying drawings.

BRIEF DESCRIPTION OF THE DRAWINGS

FIGS. 4A-4H and FIGS. 5A-5D are pulse waveform illustrations showing the phase in which switching elements are controlled.

DESCRIPTION OF THE PREFERRED EMBODIMENTS

Figure 1:
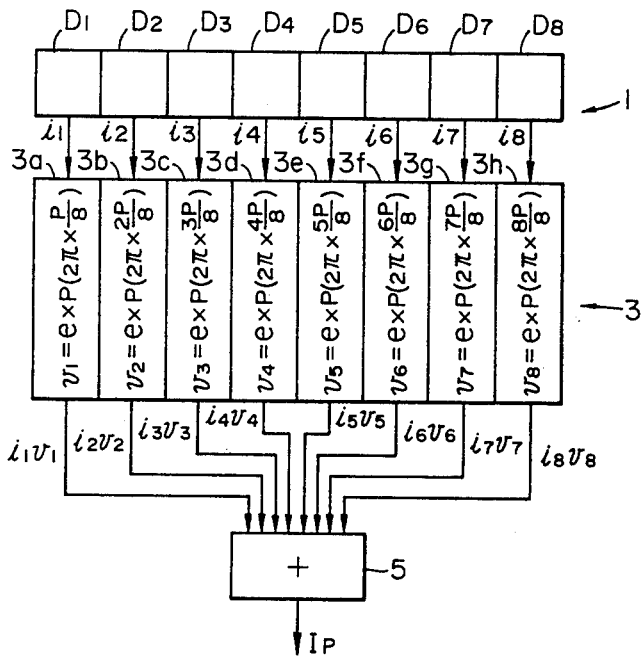
FIG. 1 is a block diagram for illustrating the principle of the present invention.

Referring to FIG. 1 which is a block diagram for illustrating the principle of the present invention, a photoelectric element array 1 is provided in or near the focal plane of an image forming optical system, not shown, and this array comprises eight photoelectric elements $D_1$-$D_8$ arranged spatially in a row. Photoelectric outputs $i_1$-$i_8$ are taken out from the photoelectric elements $D_1$-$D_8$ and the values thereof represent the intensities of the lights incident on the photoelectric elements. In the present invention, vectorizing means 3 is further provided and this comprises multipliers $3_a$-$3_h$ to which the photoelectric outputs are imparted. The multipliers $3_a$-$3_h$ multiply the photoelectric outputs $i_1 \sim i_8$ by vectors $v_1 = \exp(2\pi \times p/8) \sim v_8 = \exp(2\pi \times 8p/8)$ so that an arbitrary photoelectric output $i_n$ is multiplied by a vector $v_n = \exp(2\pi \times np/8)$ (n=1~8). Consequently, the vectorizing means converts the photoelectric outputs $i_1 \sim i_8$ into vectors $i_1v_1 \sim i_8v_8$ having absolute values corresponding to the magnitudes thereof and phases deviated by $2\pi p/8$ each in the order of arrangement of the photoelectric elements. These vectors put out from the multipliers $3_a$-$3_h$ are applied to adding means 5. The adding means adds together the vectors $i_1v_1 \sim i_8v_8$. Accordingly, the composite vector $I_p$ which is the output of this adding means is $$I_p = \sum_{n=1}^{8} i_n \exp\left(2\pi \times \frac{pn}{8}\right).$$

Of course, when the number of the photoelectric elements is generalized into N, the foregoing equation becomes $$I_p = \sum_{n=1}^{N} i_n \exp\left(2\pi \times \frac{pn}{N}\right).$$

This composite vector $I_p$ will now be considered.
(1) When p=1, the composite vector becomes $$I_1 = \sum_{n=1}^{8} i_n \exp\left(2\pi \times \frac{n}{8}\right).$$

Figure 2A:
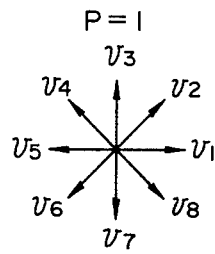
FIGS. 2A-2D show vectors for illustrating the present invention.

This is the sum of the outputs of the eight photoelectric elements $D_1$-$D_8$ multiplied by the vectors $v_1$-$v_8$ out of phase by $2\pi/8$ each as shown in FIG. 2A, and as is apparent from the above equation, it includes much of the space frequency component having the length d of the eight elements $D_1$-$D_8$ as the space period. In this case, one period is divided by eight photoelectric elements, it also slightly includes the information of the space frequency component having d/7 as the space period and higher degrees of space frequency component. Accordingly, when p=1, the composite vector $I_1$ is one from which the space frequency component of space period d in the light image projected upon the array 1 has been chiefly extracted.

(2) When p=2, the composite vector $I_2$ is $$I_2 = \sum_{n=1}^{8} i_n \exp\left(2\pi \times \frac{n}{4}\right).$$

Figure 2B:
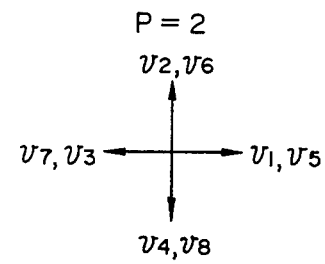

This is the sum of the outputs of the elements $D_1$-$D_8$ multiplied by the vectors $v_1$-$v_8$ successively out of phase by $\pi/2$ each as shown in FIG. 2B, and it is a vector from which the space frequency component of space period d/2 in the light image has been chiefly extracted.

Figure 2C:
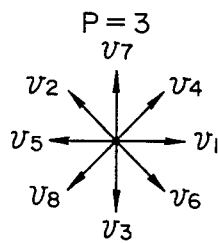
Figure 2D:
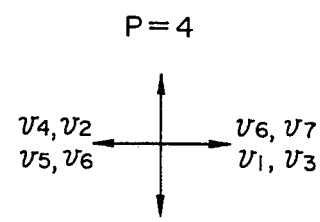

(3) When p=3 and p=4, the composite vectors $I_3$ and $I_4$ respectively are the sum of the photoelectric outputs $i_1$-$i_8$ multiplied by the vectors $v_1$-$v_8$ out of phase by $3\pi/4$ and $\pi$ as shown in FIGS. 2C and 2D, and they are vectors from which the space frequency components of space periods d/3 and d/4, respectively, have been chiefly extracted.

In the foregoing, the composite vectors $I_1$-$I_3$ include the magnitudes of the respective spacific space frequency components and phase information, whereas the composite vector $I_4$ as the output includes only magnitude information and does not include phase information, as is apparent from FIG. 2D.

When p=0, $I_0$ represents the total quantity of light incident on the photoelectric elements $D_1$-$D_8$.

Accordingly, by individually providing vectorising means and adding means for p=1, p=2, p=3 and p=4, the information of space frequency components of space periods d, d/2, d/3 and d/4 can be extracted.

The value which p can assume is an integer equal to or less than one-half of the number N of the photoelectric elements constituting the maximum space period of a plurality of space frequency components which it is desired to extract, namely, N/2. Accordingly, the value which p can assume in the foregoing example is substantially 1 to 4 and if p assumes 5 or a greater value, the extracted information becomes identical to any of the cases where p=1~p=4 and after all, results in any of p=1~p=4. For example, the information extracted when p=5 is identical to p=3.

Figure 3A:
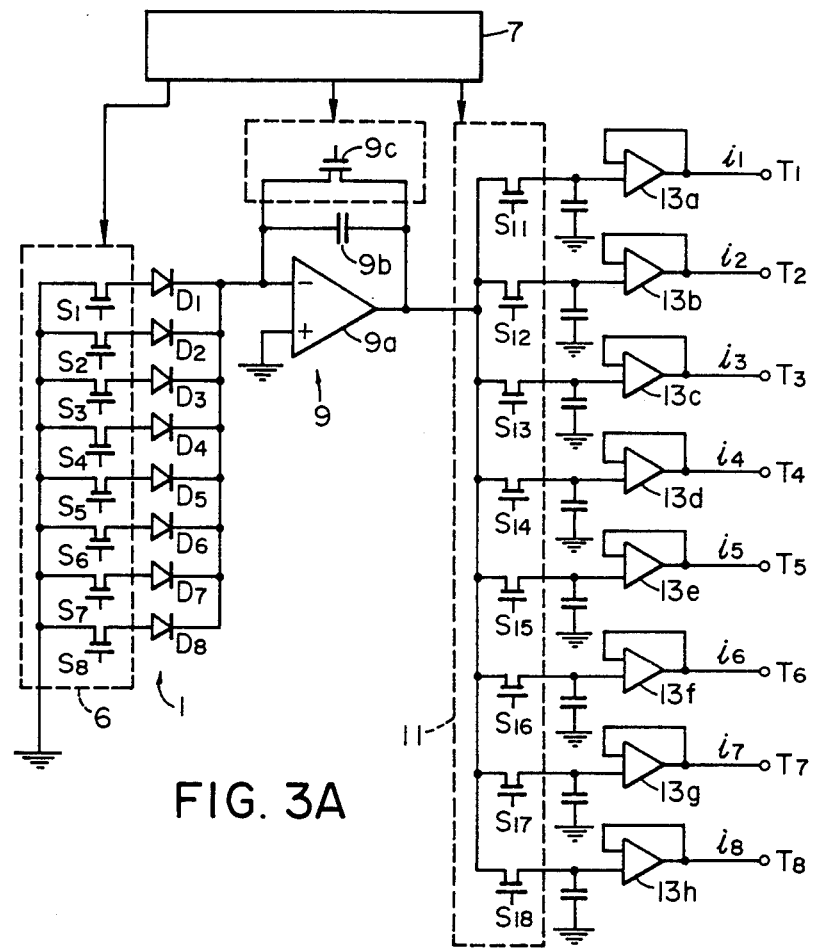
FIGS. 3A—3F are circuit diagrams showing a first embodiment of the device according to the present invention.

Embodiments of the present invention will now be described. FIG. 3A shows an embodiment of the photoelectric converting unit of the device according to the present invention. A photodiode array 1 comprises eight parallel-connected photodiodes $D_1$-$D_8$. FET switching elements $S_1$-$S_8$ are connected to the respective photodiodes, thereby forming a first switching element group 6. The FET switching elements $S_1$-$S_8$ are all made to have the same period by a pulse generator 7, but the FET switching elements $S_1$ to $S_8$ are successively momemtarily switched on with a predetermined time delay. Accordingly, the photodiodes $D_1$-$D_8$ generate photoelectric outputs related to said period and the intensities of incident light upon switching-on of the associated FET switching elements $S_1$-$S_8$.

The photoelectric outputs are imparted to a sampling hold circuit 9. This sampling hold circuit 9 comprises an operational amplifier 9a, a feedback capacitor 9b and a reset switch 9c. The sampling hold circuit 9 temporally holds the photoelectric outputs successively generated by the photodiodes $D_1$-$D_8$ at a predetermined time interval upon switching-on of the the FET switching elements $S_1$-$S_8$. The reset switch 9c is momentarily switched on immediately before the switching-on of each FET switching element $S_1$-$S_8$ to reset the previously held photoelectric output for the purpose of holding the next photoelectric output.

The output of the sampling hold circuit 9 is applied to a second switching element group 11. This second switching element group 11 comprises parallel-connected FET switching elements $S_{11}$-$S_{18}$, which are successively switched on with a predetermined time delay by the pulse generator 7 in synchronism with the FET switching elements $S_1$-$S_8$. In this manner, the FET switching element $S_{11}$ delivers the photoelectric output of the photodiode $D_1$ held by the sampling hold circuit 9 to a hold circuit 13a comprising a capacitor and an operational amplifier, the FET switching element $S_{12}$ delivers the similar photoelectric output of the photodiode $D_2$ to a hold circuit 13b, and likewise the FET switching elements $S_{13}$-$S_{18}$ deliver the photoelectric outputs of the photodiodes $D_3$-$D_8$ to hold circuits 13c-13h, respectively. Thus, the photoelectric outputs of the photodiodes $D_1$-$D_8$ are time-sequentially taken out and successively held by the corresponding hold circuits 13a-13h. The photoelectric outputs put out at the output terminals $T_1$-$T_8$ of these hold circuits 13a-13h are defined as $i_1$-$i_8$ corresponding to the photoelectric outputs $i_1$-$i_8$ of FIG. 1.

Figure 3B:
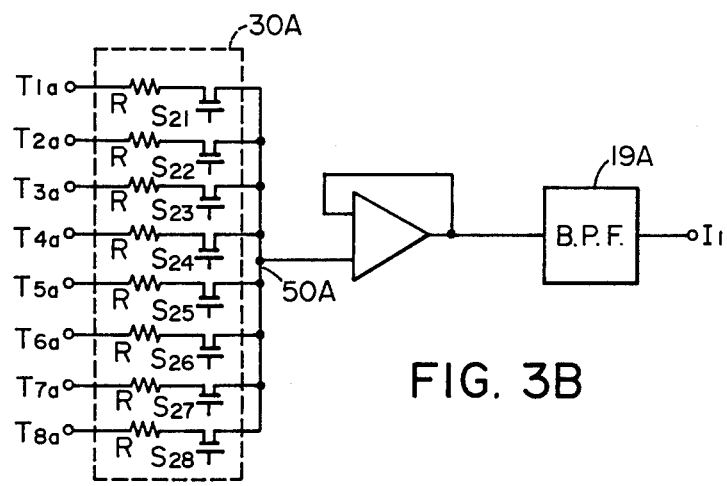

A circuit for extracting the space frequency component of space period d from the photoelectric outputs $i_1$-$i_8$ will now be described with reference to FIG. 3B. Terminals $T_{1a}$-$T_{8a}$ are connected to corresponding output terminals $T_1$-$T_8$ in such a manner that, for example, $T_{1a}$ is connected to $T_1$. These terminals $T_{1a}$-$T_{8a}$ provide the input terminals of a vectorizing circuit 30A. The vectorizing circuit 30A comprises resistors R connected to the output terminals and a third switching element group $S_{21}$-$S_{28}$ series-connected to each of the resistor R. The switching elements $S_{21}$-$S_{28}$ are all switched on and off at the same period T, as shown in FIGS. 4A–4H. The time during which these switching elements are switched on and the time during which these switching elements are switched off are equal to each other. Each of the switching elements $S_{21}$-$S_{28}$ has a time delay of T/8, i.e. $2\pi/8$. Accordingly, the photoelectric outputs $i_1$-$i_8$ are successively imparted a phase delayed by T/8, i.e. $2\pi/8$ in the order of arrangement of the elements by the switching elements $S_{21}$-$S_{28}$, and are converted into rectangular wave AC signals or vectors having amplitudes related to the magnitudes of the photoelectric outputs and said phase. These AC signals are added together by a common conductor 50A which acts as adding means 5.

The vector signals added together are applied to a band-pass filter 19A having a pass band in an angular frequency $2\pi/T$. This filter extracts only the sine wave component of angular frequency $2\pi/T$ from the rectangular wave AC signals.

What has been described above will now be expressed by mathematical expressions. After the photoelectric outputs $i_1$-$i_8$ have been converted into rectangular wave signals by the switching elements $S_{21}$-$S_{28}$, only the angular frequency component of $2\pi/T$ is extracted by the band-pass filter 19A and so, in the following description, only the sine wave of angular frequency $2\pi/T$ will be explained.

The photoelectric outputs in (n=1 ... 8) are converted into in exp $(2\pi/T \, t + 2\pi \times n/8)$ by the vectorizing circuit 30A. These are added together at a connection point 50A to provide a composite output $I_1$, which is $$I_1 = \sum_{n=1}^{8} in \cdot \exp\left(\frac{2\pi}{T} t + 2\pi \times \frac{n}{8}\right)$$

$$= \exp\left(\frac{2\pi}{T} t\right) \sum_{n=1}^{8} in \cdot \exp\left(2\pi \times \frac{n}{8}\right).$$

As seen from this equation, the amplitude and phase of the output $I_1$ of the band-pass filter 19A represent the magnitude and phase information of the space frequency component of space period d in the light image.

Figure 3C:
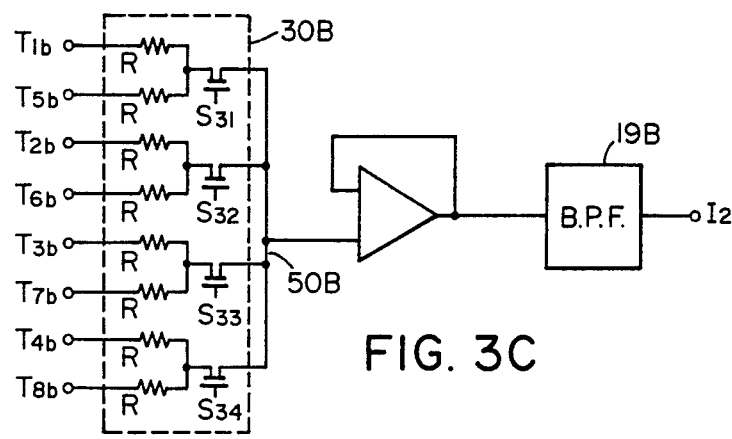

FIG. 3C shows a circuit for extracting the space frequency component of space period d/2. The input terminals $T_{1b}$-$T_{8b}$ of this circuit are connected to the output terminals $T_1$-$T_8$, respectively, in such a manner that the terminal $T_{1b}$ is connected to the terminal $T_1$. The photoelectric outputs $i_1$ and $i_5$ are converted into vectors of the same phase by a vectorizing circuit 30B and are therefore applied to the same switching element $S_{31}$ through resistors R. The sets of photoelectric outputs $i_2$, $i_6$, $i_3$, $i_7$; $i_4$, $i_8$ are likewise applied to the same switching elements $S_{32}$, $S_{33}$ and $S_{34}$. The switching elements $S_{31}$-$S_{34}$ have the same period T as shown in FIGS. 5A–5D, but are successively switched on with a delay of T/4. The outputs of the vectorizing circuit 30B are added together by a common conductor 50B which acts as an adder. The added outputs are filtered by a bandpass filter 19B. The filter 19B may be identical to the filter 19A. By the same reason as set forth above, the output $I_2$ of the band-pass filter 19B represents the information of the space frequency component of space period d/2.

Figure 3D:
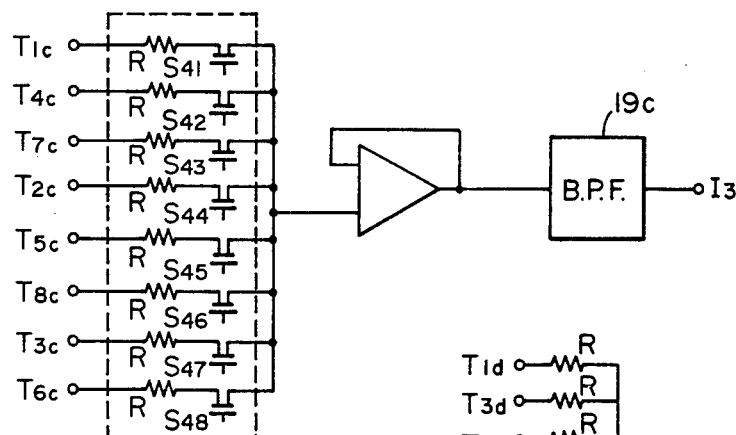

FIG. 3D shows a circuit for extracting the space frequency component of space period d/3. The input terminals $T_{1c}$-$T_{8c}$ of this circuit are connected to the output terminals $T_1$-$T_8$, respectively, in such a manner that the terminal $T_{1c}$ is connected to the terminal $T_1$. Switching elements $S_{41}$-$S_{48}$ are controlled just in the same manner as the aforementioned switching elements $S_{21}$-$S_{28}$. The output $I_3$ of a band-pass filter 19c which has been subjected to addition and filtration represents the information of the space frequency component of space period d/3.

Figure 3E:
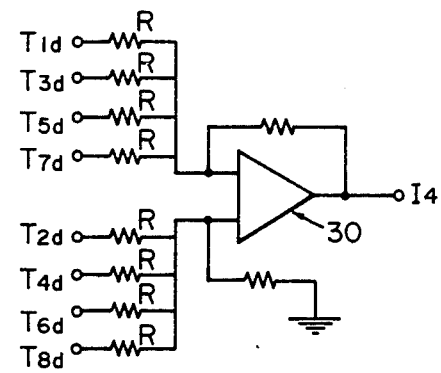

FIG. 3E shows a circuit for extracting the information of the space frequency component of space period d/2. The input terminals $T_{1d}$-$T_{8d}$ of this circuit are connected to the output terminals $T_1$-$T_8$, respectively. As is apparent from FIG. 2D, the photoelectric outputs $i_1$ and $i_2$, $i_3$ and $i_4$, $i_5$ and $i_6$, $i_7$ and $i_8$ are multiplied by vectors deviated by $\pi$ each in phase and therefore, after all, the difference between the two may be taken. Therefore, the photoelectric outputs $i_1$, $i_3$, $i_5$ and $i_7$ are added together by the resistor R and the photoelectric outputs $i_2$, $i_4$, $i_6$ and $i_8$ are likewise added together and the difference between the addition outputs is obtained by a differential amplifier 30 to thereby obtain a composite vector $I_4$.

Figure 3F:
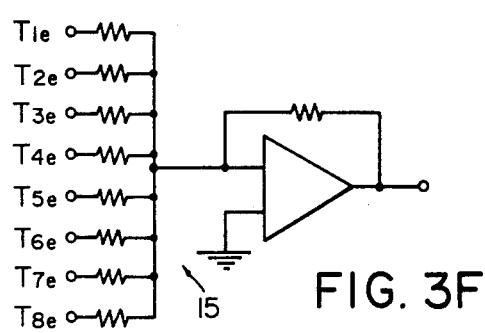

FIG. 3F shows a circuit for obtaining the total quantity of light. The input terminals $T_{1e}$-$T_{8e}$ of this circuit are connected to the output terminals $T_1$-$T_8$, respectively. The photoelectric outputs $i_1$-$i_8$ are intactly added together by an adding circuit 15 through adding resistors.

In FIG. 3C, to effectively utilize the photoelectric outputs from the array, the information of the space frequency component of space period d/2 has been obtained by the use of all the photoelectric outputs $i_1$-$i_8$, but this space period is equal to the length of four continuous photoelectric elements and therefore, the information can be likewise obtained by using only the photoelectric outputs of four continuous photoelectric elements such as, for example, photoelectric outputs $i_1$-$i_4$ or $i_5$-$i_8$. Of course, this also holds true with the output $I_4$ and the information can be obtained from only the outputs of several adjacent photoelectric elements.

Figure 6:
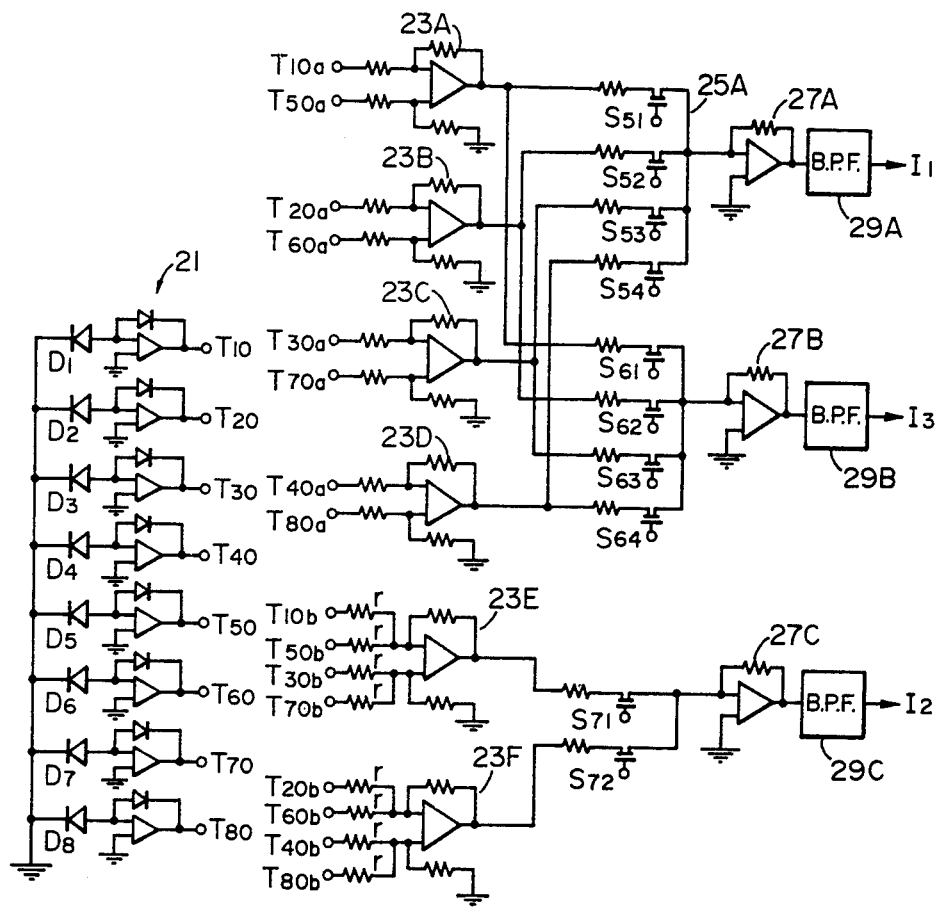
FIG. 6 is a circuit diagram showing a second embodiment of the device according to the present invention.

FIG. 6 shows a second embodiment of the present invention. A logarithmic convertion circuit group 21 connected to photodiodes $D_1$-$D_8$ constituting a photodiode array generates at output terminals $T_{10}$-$T_{80}$ photoelectric outputs proportional to the logarithm of the intensities of light incident on the photodiodes $D_1$-$D_8$. Terminals $T_{10a}$-$T_{80a}$ are connected to the corresponding output terminals $T_{10}$-$T_{80}$, respectively, in such a manner that the terminal $T_{10a}$ is connected to the terminal $T_{10}$. The inputs of the terminals $T_{10a}$ and $T_{50a}$, $T_{20a}$ and $T_{60a}$, $T_{30a}$ and $T_{70a}$, $T_{40a}$ and $T_{80a}$ are connected so that the differences therebetween are taken by differential amplifiers 23A–23D, respectively. Switching elements $S_{51}$-$S_{54}$ connected to the outputs of the respective differential amplifiers are similar to the aforementioned switching elements $S_{21}$-$S_{28}$ and are successively switched on with a phase delay of T/8, i.e. $\pi/4$, as shown in FIGS. 4A–4D. Signals passed through the switching elements $S_{51}$-$S_{54}$ are added together by a common conductor 25A which acts as adding means. The added outputs are obtained through an inverting amplifier 27A and a band-pass filter 29A. As is so apparent from FIG. 2A, the differences between pairs of photoelectric outputs ($i_1$ and $i_5$), ($i_2$ and $i_6$), ($i_3$ and $i_7$) and ($i_4$ and $i_8$) which are respectively multiplied by pairs of vectors out of phase by $\pi$ each, ($v_1$ and $v_5$), ($v_2$ and $v_6$), ($v_3$ and $v_7$) and ($v_4$ and $v_8$) are obtained by differential amplifiers 23A, 23B, 23C and 23D and therefore, phase information can be imparted to these pairs of photoelectric outputs by common switching elements $S_{51}$-$S_{54}$. Accordingly, in this embodiment, the number of switching elements $S_{51}$-$S_{54}$ may be half the number of switching elements $S_{21}$-$S_{28}$ used in the first embodiment.

The case of the output $I_3$ is also the same as the case of the output $I_1$, but as shown in FIG. 2C, vectors $v_1$, $v_2$, $v_3$ and $v_4$ are out of phase by $\frac{3}{4}\pi$ each and therefore, switching elements $S_{61}$-$S_{64}$ connected to the outputs of the differential amplifiers 23A-23D may be successively switched on and off with a phase delay of $\frac{3}{4}\pi$ as shown by $S_{41}$, $S_{44}$, $S_{47}$ and $S_{42}$ in FIG. 3D.

As to the case of the output $I_2$, as shown in FIG. 2B, the pair of vectors $v_1$ and $v_5$ are of the same phase and therefore, $i_1$ and $i_5$ are added together by a resistor r. Likewise, photoelectric outputs $i_3$ and $i_7$ related to the pair of vectors $v_3$ and $v_7$ of the same phase are also added together. These two pairs of vectors are out of phase by $\pi$ and so, the difference between the added photoelectric outputs is obtained by a differential amplifier 23E. Photoelectric outputs $i_2$, $i_4$, $i_6$ and $i_8$ related to vectors $v_2$, $v_4$, $v_6$ and $v_8$ are subjected to the same processing as that described above, to thereby obtain the output of a differential amplifier 23F. Since the vectors $v_1$ and $v_2$ are out of phase by $\pi/2$, the output $I_2$ may be obtained by making the switching on and off of the switching elements $S_{71}$ and $S_{72}$ out of phase by $\pi/2$.

The output $I_4$ can be obtained by the construction of FIG. 3E, as already described.

In the second embodiment, the photoelectric outputs multiplied by vectors out of phase by $\pi$ have the differences therebetween calculated in advance by the differential amplifiers 23A-23D and this leads to an advantage that the number of the switching elements for imparting the phases of vectors to those photoelectric outputs can be reduced to half as compared with the first embodiment. Further, these photoelectric outputs are amplified when the differences therebetween are calculated, and such amplification is preferable because these photoelectric outputs are of relatively small values proportional to the logarithms of the intensities of light.

Figure 7:
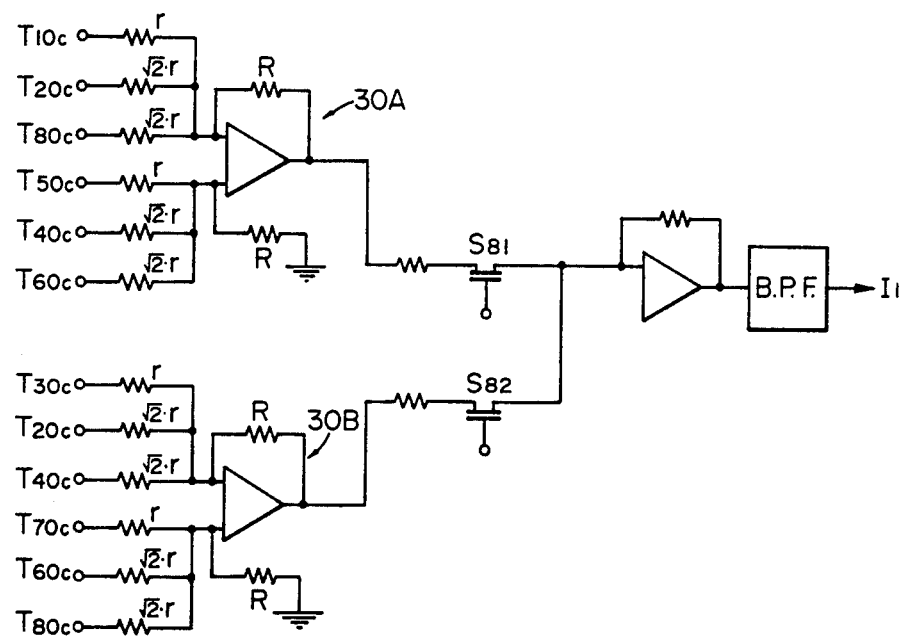
FIG. 7 is a circuit diagram showing a third embodiment of the device according to the present invention.

FIG. 7 shows a third embodiment which uses two switching elements in accordance with a technique similar to that of FIG. 6. In FIG. 7, input terminals $T_{10c}$-$T_{80c}$ are connected to the output terminals $T_{10}$-$T_{80}$ of photodiodes $D_1$-$D_8$ similar to those of FIG. 6 in such a manner that the terminal $T_{10c}$ is connected to the terminal $T_{10}$. Referring to FIG. 2A, the direction of vectors $v_1$ and $v_5$ is defined as x-axis, and the direction of vectors $v_3$ and $v_7$ is defined as y-axis, and vectors $v_2$, $v_4$, $v_6$ and $v_8$ are respectively decomposed into two vectors respectively having senses in the directions of the x-axis and y-axis, namely, vectors $v_{2x}$, $v_{2y}$, $v_{4x}$, $v_{4y}$, $v_{6x}$, $v_{6y}$, $v_{8x}$, $v_{8y}$. The size of each of these decomposed vectors is $1/\sqrt{2}$ of the sizes of vectors $v_2$, $v_4$, $v_6$ and $v_8$. As shown in FIG. 7, in order that photoelectric outputs $i_1$, $i_2$ and $i_8$ appearing at terminals $t_{10}$, $T_{20}$ and $T_{80}$ may be multiplied by vectors $v_1$, $v_{2x}$ and $v_{8x}$, terminals $T_{10c}$, $T_{20c}$ and $T_{80c}$ are connected to one input terminal of a differential amplifier 30A through resistors r, $\sqrt{2}r$ and $\sqrt{2}\cdot r$ of values inversely proportional to the sizes of the vectors $v_1$, $v_{2x}$ and $v_{8x}$, respectively, and in order that the photoelectric outputs $i_5$, $i_4$ and $i_6$ of output terminals $T_{50}$, $T_{40}$ and $T_{60}$ may be multiplied by vectors $v_5$, $v_{4x}$ and $v_{6x}$ which are out of phase by $\pi$ with the vectors $v_1$, $v_{2x}$ and $v_{8x}$, terminals $T_{50c}$, $T_{40c}$ and $T_{60c}$ are connected to the other input terminal of the differential amplifier 30A through resistors r, $\sqrt{2}r$ and $\sqrt{2}\cdot r$ of values inversely proportional to the sizes of the vectors $v_5$, $v_{4x}$ and $v_{6x}$, respectively. By this, the output of the differential amplifier 30A becomes a composite vector which is the sum of photoelectric outputs $i_1$, $i_2$, $i_4$, $i_5$, $i_6$ and $i_8$ multiplied by vectors $v_1$, $v_{2x}$, $v_{4x}$, $v_5$, $v_{6x}$ and $v_{8x}$, respectively. Likewise, in order that photoelectric outputs $i_3$, $i_2$ and $i_4$ may be multiplied by vectors $v_3$, $v_{2y}$ and $v_{4y}$, terminals $T_{30c}$, $T_{20c}$ and $T_{40c}$ are connected to one input terminal of a differential amplifier 30B through resistors r, $\sqrt{2}r$ and $\sqrt{2}\cdot r$, and in order that photoelectric outputs $i_7$, $i_6$ and $i_8$ may be multiplied by vectors $v_7$, $v_{6y}$ and $v_{8y}$, terminals $T_{70c}$, $T_{60c}$ and $T_{80c}$ are connected to the other input terminal of the differential amplifier 30B through resistors r, $\sqrt{2}r$ and $\sqrt{2}\cdot r$. Thus, the output of the differential amplifier 30B becomes a composite vector which is the sum of photoelectric outputs $i_2$, $i_3$, $i_4$, $i_6$, $i_7$ and $i_8$ multiplied by vectors $v_{2y}$, $v_3$, $v_{4y}$, $v_{6y}$, $v_7$ and $v_{8y}$, respectively. In order that a phase difference of $\pi/2$ may be imparted to the outputs of the differential amplifiers 30A and 30B, switching elements $S_{81}$ and $S_{82}$ are switched on and off with a phase deviation of T/4, i.e. $\pi/2$.

Thus, the final composite vector $I_1$ is obtained. The composite vector $I_3$ can be obtained by the use of two switching elements through a similar technique. Where each vector to multiply the photoelectric outputs is decomposed into vectors having senses in the directions of the x-axis and y-axis and the photoelectric outputs are multiplied by such decomposed vectors, the decomposed vectors are out of phase with one another by $\pi/2$ or $\pi$ and such phase deviation of $\pi$ can be treated by a differential amplifier and thus, the phase deviation of $\pi/2$ may be treated by the use of two switching elements.

Figure 8A:
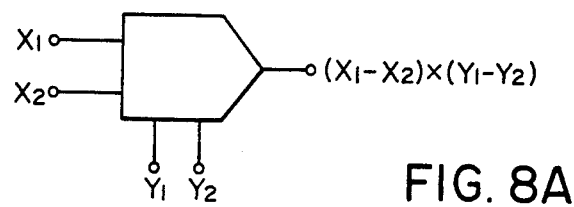
FIGS. 8A and 8B are circuit diagrams showing a fourth embodiment of the device according to the present invention.
Figure 8B:
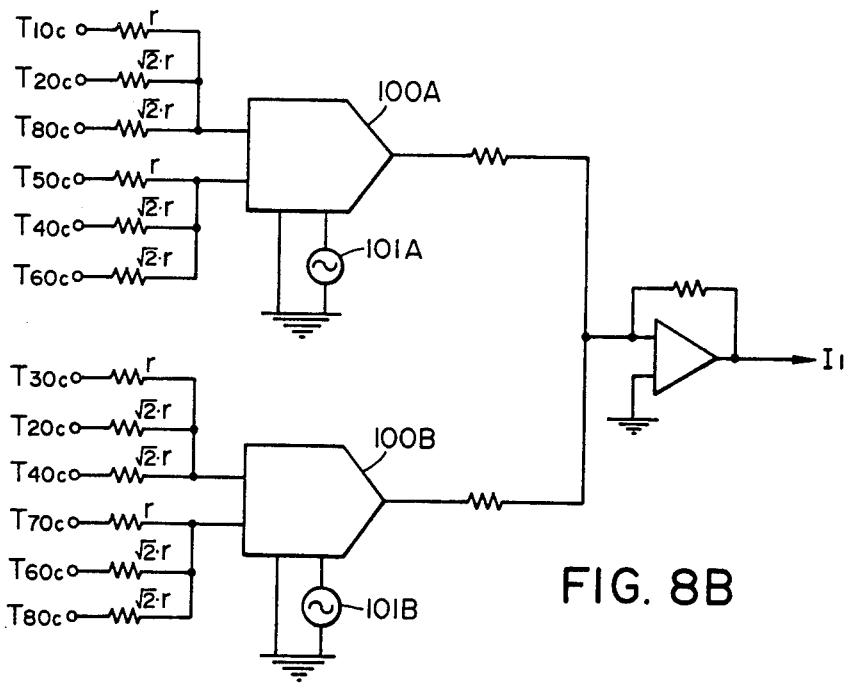

In the embodiment of FIG. 7, the outputs of the differential amplifiers 30A and 30B are modulated into rectangular waves having a phase difference of $\pi/2$ by the switching elements $S_{81}$ and $S_{82}$ and then added together, but multipliers may be used as such modulating means as shown in FIGS. 8A and 8B. Multipliers 100A and 100B each having an output $(X_1-X_2)\times(Y_1-Y_2)$ for inputs $X_1,X_2$ and $Y_1,Y_2$ as shown in FIG. 8A may be connected as shown in FIG. 8B and an input of a $\cos \omega t$ may be imparted from an oscillator 101A to the multiplier 100A and an input of a $\sin \omega t$ from an oscillator 101B to the multiplier 100B to thereby effect modulation and the outputs thereof may be added together to obtain the final composite vectors $I_1$ and $I_3$.

Figure 9:
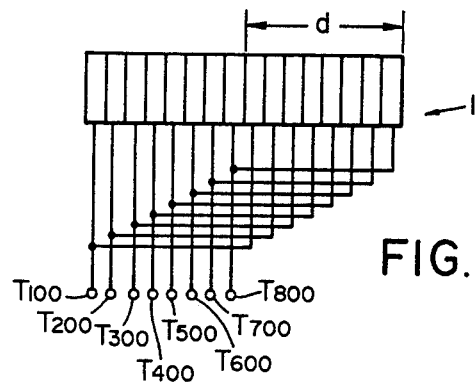
FIG. 9 shows a modification of the arrangement of the photoelectric element array included in the device of the present invention.

While the present invention have been described with respect to the shown embodiments, these are mere examples and many other modifications are conceivable. In the shown embodiments, vectorizing means converts the photoelectric outputs into AC outputs out of phase with one another in the order of arrangement of the elements, but the photoelectric outputs can also be multiplied, for example, by vectors in the form of x and y components. In the present invention, the number of the photoelectric elements constituting the maximum space period d is not limited to 8 (eight). Further, the photoelectric element array comprises N (eight in the above example) photoelectric elements corresponding to the maximum space period d of a plurality of space frequency components to be extracted, but of course the array may comprise more than N, photoelectric elements. Such an example is shown in FIG. 9. In FIG. 9, the photoelectric element array 1 comprises sixteen photoelectric elements corresponding to two periods. The output terminals of every eighth photoelectric element are connected together and connected to output terminals $T_{100}$–$T_{800}$. These output terminals $T_{100}$–$T_{800}$ in turn are connected to vectorizing circuits concerned with the space frequency components to be extracted.

What we claim is:

1. A device for extracting a plurality of spaces frequency components from an optical image formed by an image forming optical system, comprising:

(a) a photoelectric element array including at least N photoelectric elements disposed in or near the image formation plane of said image forming optical system; and (b) means for generating, on the basis of the output of each of the photoelectric elements of said array, an electrical output varying in phase in accordance with the displacement of said optical image in the direction of arrangement of said photoelectric elements, said means including first vectorizing means for converting the outputs of said photoelectric elements into vectors so that the output of the nth photoelectric element of said array becomes a vector having an absolute value related to said output and a phase given by $\pi/N \times p_1 \times n$, first adding means for adding together the vector outputs of said first vectorizing means, second vectorizing means for converting the outputs of said photoelectric elements into vectors so that the output of the nth photoelectric element of said array becomes a vector having an absolute value related to said output and a phase given by $2\pi/N \times p_2 \times n$, and second adding means for adding together the vector outputs of said second vectorizing means, where $p_1$ and $p_2$ are different integers less than $N/2$.

2. The device according to claim 1, wherein each of said first and second vectorizing means includes:

means for receiving as inputs the outputs of two of said photoelectric elements converted into vectors out of phase by $\pi$ with each other, of the outputs of said photoelectric elements, and calculating and putting out the difference between said inputs.

3. The device according to claim 1 or 2, wherein said integers $p_1$ and $p_2$ are $p_1 = 1$ and $p_2 = 2$.

4. The device according to claim 1, wherein each of said first and second vectorizing means includes:

(a) means for putting out the sum of the first direction components of the outputs of said photoelectric elements;

(b) means for putting out the sum of the second direction components of the outputs of said photoelectric elements which are out of phase by $\pi$ with said first direction components;

(c) means for calculating the difference between the sum of the first direction components and the sum of the second direction components;

(d) means for putting out the sum of the third direction components of the outputs of said photoelectric elements which are out of phase by $\pi/2$ with said first direction components; (e) means for putting out the sum of the fourth direction components of the outputs of said photoelectric elements which are out of phase by $\pi$ with said third direction components; and (f) means for calculating the difference between the sum of the third direction components and the sum of the fourth direction components.

* * * * *

UNITED STATES PATENT AND TRADEMARK OFFICE
CERTIFICATE OF CORRECTION

PATENT NO. : 4,306,143
DATED : December 15, 1981
INVENTOR(S) : KEN UTAGAWA, ET AL.

It is certified that error appears in the above-identified patent and that said Letters Patent are hereby corrected as shown below:

Column 3, line 55, "spacific" should be --specific--.
Column 4, line 27, "temporally" should be --temporarily--.
Column 5, line 63, "By" should be --For--.
Column 6, line 64, after "is" delete "so".
Column 7, line 61, "$t_{10}$" should be --$T_{10}$--.

Claim 1, line 1, "spaces" should be --space--.

Signed and Sealed this

Ninth Day of March 1982

[SEAL]

Attest:

GERALD J. MOSSINGHOFF

Attesting Officer     Commissioner of Patents and Trademarks